Dec. 25, 1945.  E. A. COHEN  2,391,445
COUNTER PORTION FOR SHOES
Filed July 8, 1944
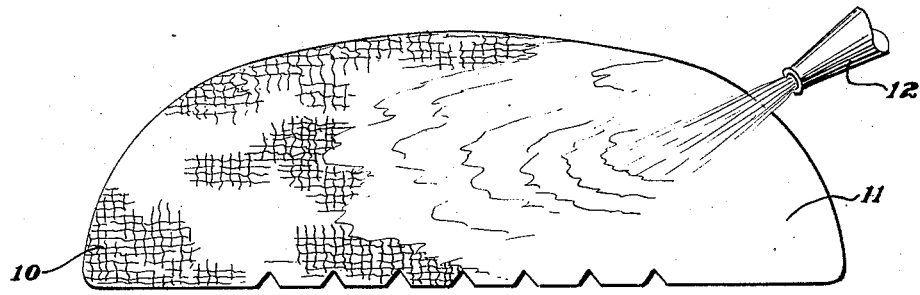
Fig. 1
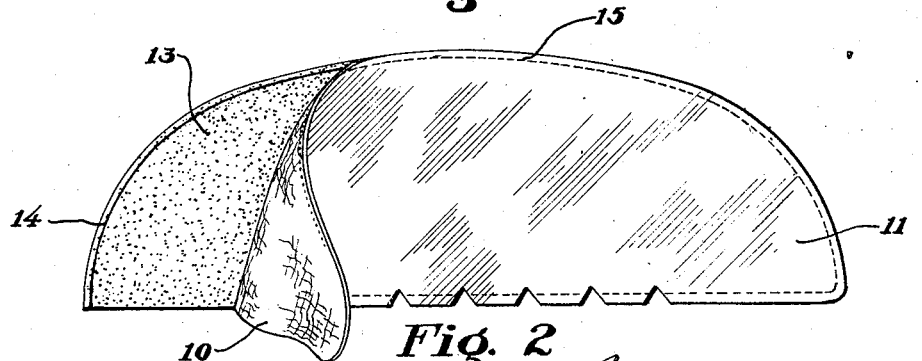
Fig. 2
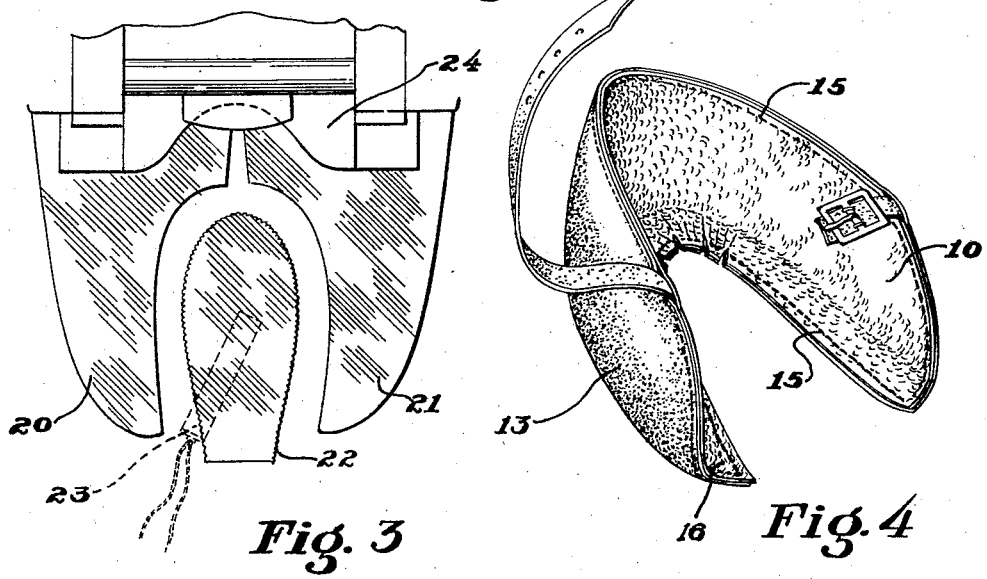
Fig. 3
Fig. 4
INVENTOR.
Eli A. Cohen.
BY
ATTORNEY Patented Dec. 25, 1945

2,391,445

UNITED STATES PATENT OFFICE 2,391,445

COUNTER PORTION FOR SHOES

Eli A. Cohen, Stoneham, Mass.

Application July 8, 1944, Serial No. 543,976

3 Claims. (Cl. 36—68)

This invention consists in an improved counter portion for a shoe or sandal characterized by a single ply lining and stiffening member having the functions of supplying the necessary stiffness to maintain the fine shoemaking lines desired in the counter portion of a shoe, and also of presenting a lining surface satisfactory in appearance and texture for the inside of the shoe.

In the construction of counter pockets for shoes, it has been the practice to insert a fibre counter stiffening member as a distinct or unitary element between the leather or outer integument and an inner textile lining. The stiffening member is molded either separately or with the other plies of the counter pocket, but in commercial shoemaking practice a three-ply construction has been heretofore considered necessary and this entails fitting, tempering and assembling operations which must be carried out with accuracy in order to insure a satisfactory product. The three-ply structure also necessarily results in a considerable and sometimes objectionable thickness of material which it is sometimes difficult to shape smoothly and accurately to the last about the heel seat of the shoe or sandal.

The principal object of the present invention is to provide a two-ply counter construction possessing inherently all the necessary stiffness for the counter portion of a shoe and having the advantages of easier and more convenient molding than heretofore as compared to the usual three-ply construction. Thus an important economy is introduced into the shoemaking process both because less material is used and because the number of shoemaking operations required is correspondingly reduced. The thinner material has the additional advantage of permitting the counter to conform more closely to the fine lines of the last than a counter of three-ply construction.

I have discovered that all these and other desirable results may be achieved by employing as the inner member of the counter portion fibre or cardboard sheet material coated with pyroxylin, vinyl, or other thermoplastic or resinous coating, and then embossed and molded so that it is formed into the desired shape and presents a surface appearance acceptable and attractive as a lining. The molding of the counter portion may be carried out with good advantage after assembling the outer integument and the inner member, since the combined thickness of these two plies is such as can be conveniently handled in counter molding machines readily available in the industry. The step of embossing the exposed face of the inner member may be carried out at any convenient time, but there are certain advantages in economy of manufacture which result from combining the counter molding and embossing operation and the present invention includes this procedure as an important though optional characteristic.

These and other features and characteristics of the invention will be best understood and appreciated from the following description of a preferred embodiment thereof and of the process of manufacturing it as illustrated in the accompanying drawing, in which:

Fig. 1 is a plan view of the combined lining and stiffening member suggesting the coating step;

Fig. 2 is a similar view showing the inner and outer members of the counter portion in assembled relation;

Fig. 3 is a view in elevation of suitable counter molding elements for carrying out the process of my invention; and Fig. 4 is a view in perspective of the finished counter portion.

The inner member of my improved counter portion may be formed from the counter board commercially available in the industry, or any suitable fibreboard. A blank 10 of this material is died out in the required shape, skived about its margin, and pinked in its lower edge to facilitate the subsequent molding operation. It is then coated on one face with a film of pyroxylin or any suitable resinous material such as vinyl acetate. There are several thermoplastic or thermosetting resins having the necessary characteristics of strength, toughness, flexibility, resistance to moisture, etc. which are suitable for purposes of this invention. Any one of these may be applied in solvent form to form a film or coating 11 as suggested in Fig. 1. In this figure reference character 12 indicates a conventional spray nozzle.

Meanwhile, the outer integument 13 of the counter portion may be prepared in accordance with regular shoemaking practice. If this is of leather, its margin is preferably skived and folded to provide a finished edge 14, and the two blanks are assembled and stitched together by a marginal line of stiching 15 which extends across the straight edge of the blank as well as about its curved edge.

The two-ply blank thus prepared may now be molded and the counter portion thus completed by being presented to the molding instrumentalities of a counter molding machine as suggested in Fig. 3. These comprise cooperating jaws 20 and 21 presenting a U-shaped recess, a convex plug 22 which, as herein shown, is provided with an electric heating unit 23, and a reciprocatory wiper plate 24. The convex walls of the plug 22 are etched or engraved to present a pebbled effect, or any other surface design which it may be desired to impart by embossing to the coated surface of the member 10. In effecting the combined molding and embossing step, the assembled blank is placed upon the plug 22 with its straight margin projecting beyond the outer flat face of the plug. The plug is then elevated and the jaws 20 and 21 closed upon the blank with a powerful pressure. The wiper plate 24 now moves downwardly across the face of the jaws 20 and 21, wiping the projecting margin of the blank inwardly and molding it so as to form the inturned flange 16 of the counter pocket. Simultaneously the pattern on the walls of the plug 22 is embossed into the coating 11 of the inner member of the counter portion. When the complete counter portion is removed from the molds it has acquired permanently the shape imparted to it by the molds and presents a stiff and resilient structure, self-contained and preserving the contour desired in the counter portion of the shoe. The resiliency and stiffness of the finished counter portion is enhanced by the thermoplastic or thermosetting coating which is set in molded shape by the heat of the molding and embossing operation. If the counter portion is to be used in a sandal, it may be provided with a strap and buckle as shown in Fig. 4.

While, as already explained, it is advantageous to combine the molding and embossing operation, it would be within the scope of my invention to emboss the coated surface of the inner member 10 as a separate and distinct step while the assembled blanks are in flat condition or in the sheet and prior to the molding operation.

In Fig. 2 I have shown the two plies as united by a line of stitching extending about the entire margin including the straight bottom edge. When the plies are stitched in this manner it is unnecessary to cement them together. On the other hand, the bottom line of stitching may be omitted and the two plies united by cement sprayed into the heel portion after the plies have been united by stitching about the outer margin thereof. Either procedure produces a heel portion that may be manufactured with good economy and employed advantageously in the shoemaking industry.

Having thus disclosed my invention and described in detail a preferred embodiment thereof, I claim as new and desire to secure by Letters Patent:

1. A two-ply counter portion comprising an outer integument and as an inner member a fibreboard ply having a thermoplastic coating presenting an embossed exposed surface.

2. A counter portion comprising a leather, edge-finished outer ply and an attached inner ply comprising fibreboard coated with thermoplastic material, the two plies having an inturned flange in the shape of a counter and being of stiff, resilient structure and the inner ply presenting an embossed exposed face.

3. A two-ply counter portion comprising an outer integument and an inner ply of fibreboard stitched to the outer integument about its upper curved edge and across its lower edge and having a continuous coating of a tough, flexible, thermoplastic material upon its exposed face, the two plies having the form of a counter with a base attaching flange, and the coated face of the fiberboard ply presenting an embossed surface simulating the texture of a fabric shoe lining.

ELI A. COHEN.